(12) United States Patent
Min et al.

(10) Patent No.: US 9,547,558 B2
(45) Date of Patent: Jan. 17, 2017

(54) COMPUTER RECOVERY CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jie Min, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 81 days.

(21) Appl. No.: 14/695,809

(22) Filed: Apr. 24, 2015

(65) Prior Publication Data

US 2016/0306702 A1    Oct. 20, 2016

(30) Foreign Application Priority Data

Apr. 17, 2015    (CN) .......................... 2015 1 0183288

(51) Int. Cl.
*G06F 11/00*    (2006.01)
*G06F 11/14*    (2006.01)
*G06F 1/28*    (2006.01)

(52) U.S. Cl.
CPC ............. *G06F 11/1441* (2013.01); *G06F 1/28* (2013.01); *G06F 2201/805* (2013.01); *G06F 2201/81* (2013.01)

(58) Field of Classification Search
CPC .................................................... G06F 11/1441
USPC ......................................... 714/23, 22, 24, 25
See application file for complete search history.

(56) References Cited

U.S. PATENT DOCUMENTS

| | | | |
|---|---|---|---|
| 2010/0262849 A1* | 10/2010 | Chan ..................... | G06F 1/3203 713/320 |
| 2012/0081103 A1* | 4/2012 | Wang ............... | G01R 19/16566 324/76.11 |
| 2015/0058665 A1* | 2/2015 | Guo .................... | G06F 11/0721 714/10 |

\* cited by examiner

*Primary Examiner* — Dieu-Minh Le
(74) *Attorney, Agent, or Firm* — Zhigang Ma

(57) ABSTRACT

A computer recovery circuit for a computer includes a detection circuit and a recovery control circuit. The detection circuit includes a first control terminal and a first output terminal. The recovery control circuit includes a second control terminal and a second output terminal. The detection circuit is configured to detect a working status of the computer. The first control terminal is configured to receive the first voltage signal of a first voltage level when the computer malfunctions. The first output terminal is configured to output a control signal of a first voltage level to the second output terminal. The second output terminal outputs a recovery signal having a first voltage level to the south bridge chip, thereby causing the computer to restart.

12 Claims, 2 Drawing Sheets

COMPUTER RECOVERY CIRCUIT

CROSS-REFERENCE TO RELATED APPLICATIONS

This application claims priority to Chinese Patent Application No. 201510183288.5 filed on Apr. 17, 2015, the contents of which are incorporated by reference herein in its entirety.

FIELD

The subject matter herein generally relates to a computer recovery circuit.

BACKGROUND

In electronics and particularly in computer electronics, the host computer sometimes malfunctions and shutdowns. A power button of the host computer needs to be pressed for a period of time to restart the host computer.

BRIEF DESCRIPTION OF THE DRAWINGS

Implementations of the present technology will now be described, by way of example only, with reference to the attached figures.

DETAILED DESCRIPTION

Figure 1:
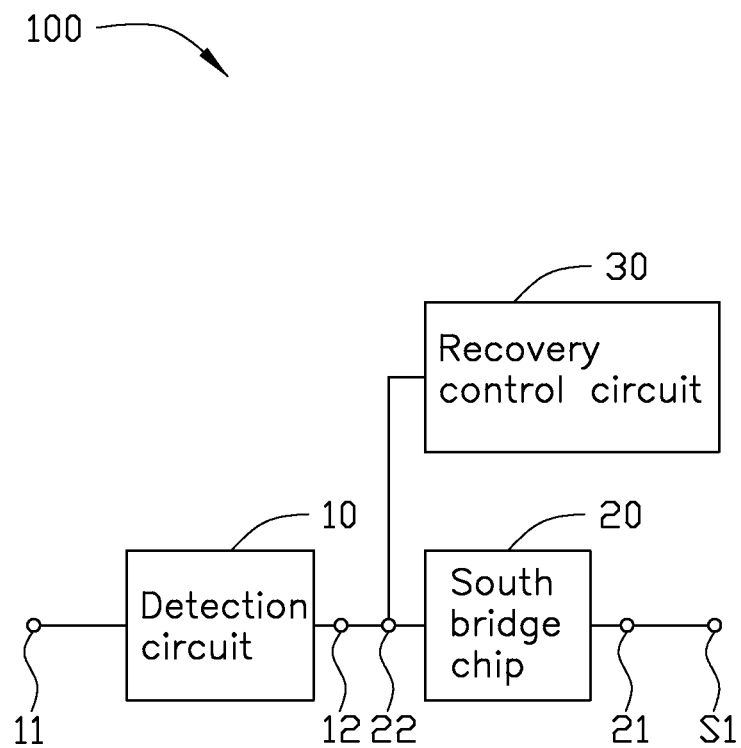
FIG. 1 is a block diagram of an embodiment of a computer recovery circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like. "Unit" means a collection of electronic hardware alone or in combination with software configured for a particular task or function, although units may overlap or share components.

FIG. 1 illustrates a computer recovery circuit for a computer 100 in accordance with one embodiment. The computer recovery circuit includes a detection circuit 10 and a recovery control circuit 20. The detection circuit 10 includes a first control terminal 11 and a first output terminal 12. The recovery control circuit 20 includes a second control terminal 21 and a second output terminal 22. The first control terminal 11 is configured to receive a first voltage signal. The second control terminal 21 is electrically coupled to a power button 51 and is configured to receive a second voltage signal. The first output terminal 12 is electrically coupled to a south bridge chip 30 via the second output terminal 22.

The detection circuit 10 is configured to detect a working status of the computer 100. The first control terminal 11 is configured to receive the first voltage signal of high voltage level when the computer 100 malfunctions. The first output terminal 12 is configured to output a control signal of low voltage level to the second output terminal 22. The second output terminal 22 maintains the outputting of a recovery signal of low voltage level to the south bridge chip 30 to restart the computer 100.

Figure 2:
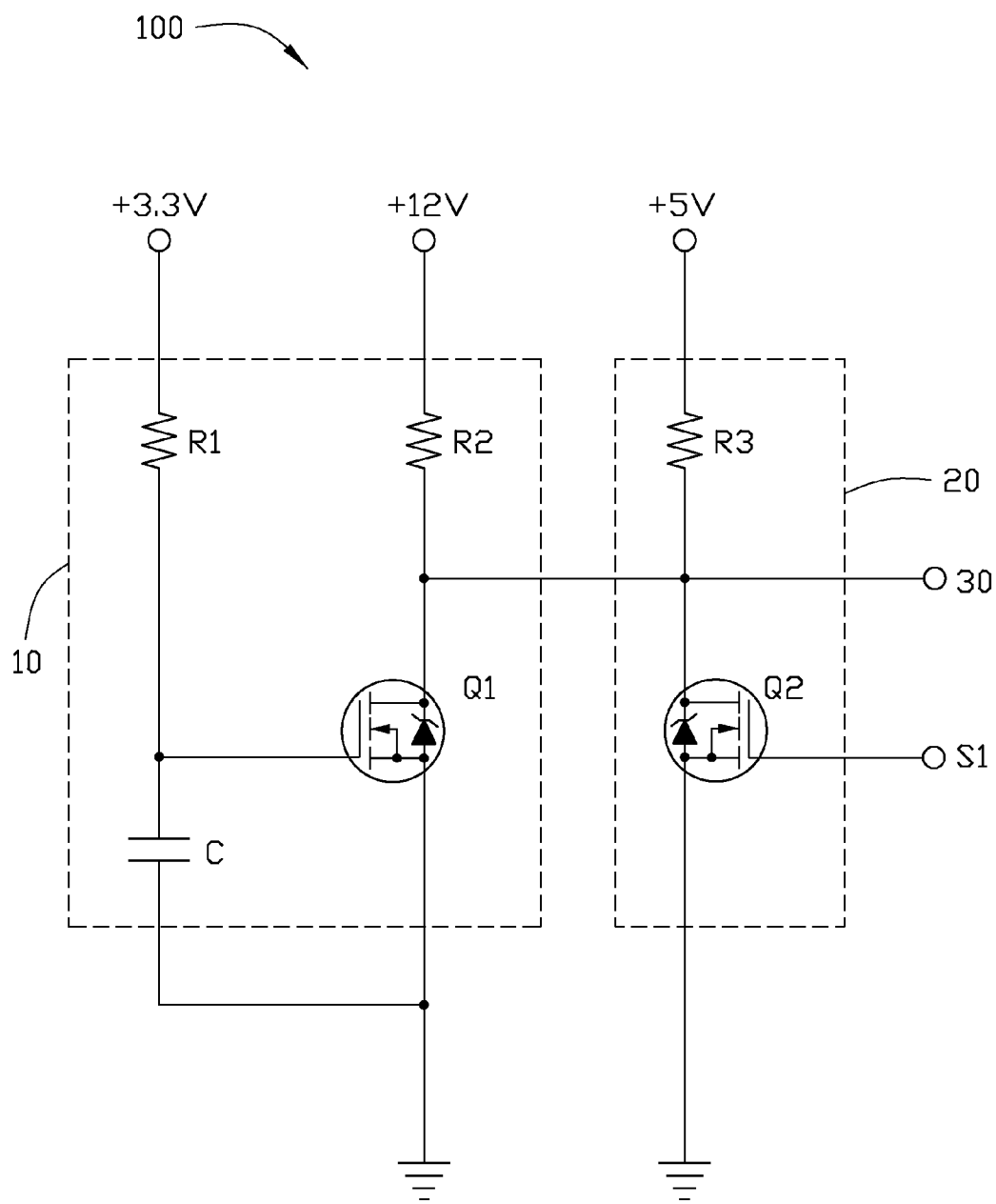
FIG. 2 is a circuit diagram of the computer recovery circuit of FIG. 1.

FIG. 2 illustrates that the detection circuit 10 includes a first switch Q1, a first resistor R1, a second resistor R2, and a capacitor C. The first switch Q1 includes a first terminal, a second terminal, and a third terminal. The first terminal of the first switch Q1 acts as the first control terminal 11 and is configured to receive the first voltage signal via the first resistor R1. The first terminal of the first switch Q1 is grounded via the capacitor C. The second terminal of the first switch Q1 is grounded. The third terminal of the first switch Q1 is configured to receive a third voltage signal via the second resistor R2. A connection point between the third terminal of the first switch Q1 and the second resistor R2 acts as the first output terminal 12 and is configured to output the control signal.

The recovery control circuit 20 includes a second switch Q2 and a third resistor R3. The second switch Q2 includes a first terminal, a second terminal, and a third terminal. The first terminal of the second switch Q2 acts as the second control terminal 21 and is configured to receive the second voltage signal. The second terminal of the second switch Q2 is grounded. The third terminal of the second switch Q2 is configured to receive a fourth voltage signal via the third resistor R3. A connection point between the third terminal of the second switch Q2 and the third resistor R3 acts as the second output terminal 22 and is configured to output the recovery signal.

In at least one embodiment, the first switch Q1 and the second switch Q2 are n channel metal-oxide-semiconductor field-effect transistors (MOSFETs), and the first terminal, the second terminal, and the third terminal of each of the first switch Q1 and the second switch Q2 are gate, source, and drain respectively. The first voltage signal is +12 volts, the third voltage signal is +5 volts, and the fourth voltage signal is +3.3 volts.

In use, when the computer 100 malfunctions, the first terminal of the first switch Q1 is configured to receive the first voltage signal of high voltage level via the first resistor R1. The first switch Q1 turns on. The connection point between the third terminal of the first switch Q1 and the second resistor R2 is configured to output the control signal of low voltage level. The connection point between the third terminal of the second switch Q2 and the third resistor R3 is configured to receive the control signal of low voltage level and is configured to output the recovery signal of low voltage level. The south bridge chip 30 is configured to receive the recovery signal of low voltage level to restart the computer 100. The power button Si is pressed again to restart the computer 100.

The embodiments shown and described above are only examples. Many details are often found in the art such as the other features of a computer recovery circuit. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A computer recovery circuit for a computer, the circuit comprising:
    a detection circuit comprising a first control terminal and a first output terminal; and
    a recovery control circuit comprising a second control terminal and a second output terminal,
    wherein the first control terminal is configured to receive a first voltage signal, the second control terminal is electrically coupled to a power button and is configured to receive a second voltage signal, the first output terminal is electrically coupled to a south bridge chip via the second output terminal, and
    wherein the detection circuit is configured to detect a working status of the computer, the first control terminal is configured to receive the first voltage signal of a first voltage level when the computer malfunctions, the first output terminal is configured to output a control signal of a first voltage level to the second output terminal, and the second output terminal outputs a recovery signal having a first voltage level to the south bridge chip, thereby causing the computer to restart.

2. The computer recovery circuit of claim 1, wherein the detection circuit comprises a first switch, a first resistor, a second resistor, and a capacitor; the first switch comprises a first terminal, a second terminal, and a third terminal; the first terminal of the first switch acts as the first control terminal and is configured to receive the first voltage signal via the first resistor; the first terminal of the first switch is grounded via the capacitor; the second terminal of the first switch is grounded; the third terminal of the first switch is configured to receive a third voltage signal via the second resistor; and a connection point between the third terminal of the first switch and the second resistor acts as the first output terminal and is configured to output the control signal.

3. The computer recovery circuit of claim 2, wherein the recovery control circuit comprises a second switch and a third resistor; the second switch comprises a first terminal, a second terminal, and a third terminal; the first terminal of the second switch acts as the second control terminal and is configured to receive the second voltage signal; the second terminal of the second switch is grounded; the third terminal of the second switch is configured to receive a fourth voltage signal via the third resistor; and a connection point between the third terminal of the second switch and the third resistor acts as the second output terminal and is configured to output the recovery signal.

4. The computer recovery circuit of claim 3, wherein the first switch and the second switch are n channel metal-oxide-semiconductor field-effect transistors (MOSFETs), and the first terminal, the second terminal, and the third terminal of each of the first switch and the second switch are gate, source, and drain respectively.

5. The computer recovery circuit of claim 3, wherein the first voltage signal is +12 volts, the third voltage signal is +5 volts, and the fourth voltage signal is +3.3 volts.

6. The computer recovery circuit of claim 3, wherein when the computer malfunctions, the first terminal of the first switch is configured to receive the first voltage signal of high voltage level via the first resistor, the first switch turns on, the connection point between the third terminal of the first switch and the second resistor is configured to output the control signal of low voltage level, the connection point between the third terminal of the second switch and the third resistor is configured to receive the control signal of low voltage level and is configured to output the recovery signal of low voltage level, the south bridge chip is configured to receive the recovery signal of low voltage level to restart the computer, and the power button is pressed again to restart the computer.

7. A computer recovery circuit, the circuit comprising:
    a detection circuit comprising a first control terminal and a first output terminal;
    a recovery control circuit comprising a second control terminal and a second output terminal; and
    a south bridge chip configured to restart a computer,
    wherein the first control terminal is configured to receive a first voltage signal, the second control terminal is electrically coupled to a power button and is configured to receive a second voltage signal, the first output terminal is electrically coupled to the south bridge chip via the second output terminal, and
    wherein the detection circuit is configured to detect a working status of the computer, the first control terminal is configured to receive the first voltage signal of a first voltage level when the computer malfunctions, the first output terminal is configured to output a control signal of a first voltage level to the second output terminal, and the second output terminal outputs a recovery signal having a first voltage level to the south bridge chip, thereby causing the computer to restart.

8. The computer recovery circuit of claim 7, wherein the detection circuit comprises a first switch, a first resistor, a second resistor, and a capacitor; the first switch comprises a first terminal, a second terminal, and a third terminal; the first terminal of the first switch acts as the first control terminal and is configured to receive the first voltage signal via the first resistor; the first terminal of the first switch is grounded via the capacitor; the second terminal of the first switch is grounded; the third terminal of the first switch is configured to receive a third voltage signal via the second resistor; and a connection point between the third terminal of the first switch and the second resistor acts as the first output terminal and is configured to output the control signal.

9. The computer recovery circuit of claim 8, wherein the recovery control circuit comprises a second switch and a third resistor; the second switch comprises a first terminal, a second terminal, and a third terminal; the first terminal of the second switch acts as the second control terminal and is configured to receive the second voltage signal; the second terminal of the second switch is grounded; the third terminal of the second switch is configured to receive a fourth voltage signal via the third resistor; and a connection point between the third terminal of the second switch and the third resistor acts as the second output terminal and is configured to output the recovery signal.

10. The computer recovery circuit of claim 9, wherein the first switch and the second switch are n channel metal-oxidesemiconductor field-effect transistors (MOSFETs), and the first terminal, the second terminal, and the third terminal of each of the first switch and the second switch are gate, source, and drain respectively.

11. The computer recovery circuit of claim 9, wherein the first voltage signal is +12 volts, the third voltage signal is +5 volts, and the fourth voltage signal is +3.3 volts.

12. The computer recovery circuit of claim 9, wherein when the computer malfunctions, the first terminal of the first switch is configured to receive the first voltage signal of high voltage level via the first resistor, the first switch turns on, the connection point between the third terminal of the first switch and the second resistor is configured to output the control signal of low voltage level, the connection point between the third terminal of the second switch and the third resistor is configured to receive the control signal of low voltage level and is configured to output the recovery signal of low voltage level, the south bridge chip is configured to receive the recovery signal of low voltage level to restart the computer, and the power button is pressed again to restart the computer.

\* \* \* \* \*